(12) United States Patent
Knisely

(10) Patent No.: US 9,169,923 B2
(45) Date of Patent: Oct. 27, 2015

(54) METHODS AND SYSTEMS FOR SHIFTING A TRANSMISSION GEAR

(71) Applicant: Blake Otis Knisely, Dublin, OH (US)

(72) Inventor: Blake Otis Knisely, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 14/019,104

(22) Filed: Sep. 5, 2013

(65) Prior Publication Data
US 2015/0059510 A1    Mar. 5, 2015

(51) Int. Cl.
*F16H 59/08* (2006.01)
*F16H 61/02* (2006.01)

(52) U.S. Cl.
CPC ...... *F16H 61/0213* (2013.01); *F16H 2059/082* (2013.01); *F16H 2059/085* (2013.01)

(58) Field of Classification Search
CPC ......... F16H 59/08; F16H 59/10; F16H 59/12; F16H 59/04; F16H 2059/086; F16H 2061/6616; F16H 2061/6617; F16H 2061/6643; Y10T 74/19251
See application file for complete search history.

(56) References Cited

U.S. PATENT DOCUMENTS

| | | | |
|---|---|---|---|
| 2,610,518 A | 9/1952 | Goedeke et al. | |
| 2,848,902 A | 8/1958 | Hale | |
| 2,939,447 A | 6/1960 | Lucas et al. | |
| 2,958,322 A | 11/1960 | McCordic | |
| 3,141,350 A | 7/1964 | Bevacqua et al. | |
| 3,958,322 A | 5/1976 | Rhodes | |
| 4,360,718 A | 11/1982 | Schobinger et al. | |
| 4,884,057 A | 11/1989 | Leorat | |
| 5,035,158 A | 7/1991 | Leigh-Monstevens | |
| 5,065,135 A | 11/1991 | Leigh-Monstevens et al. | |
| 5,566,582 A * | 10/1996 | Beadle et al. | 74/473.19 |
| 6,033,338 A | 3/2000 | Jackson et al. | |
| 6,035,735 A | 3/2000 | Graf et al. | |
| 6,199,003 B1 * | 3/2001 | Hollingsworth et al. | 701/52 |
| 6,253,138 B1 | 6/2001 | Shober et al. | |
| 6,295,887 B1 | 10/2001 | DeJonge et al. | |
| 6,487,484 B1 | 11/2002 | Shober et al. | |
| 6,602,162 B2 | 8/2003 | Quast et al. | |
| 6,849,029 B2 | 2/2005 | Loeffler | |
| 6,904,822 B2 | 6/2005 | Meyer et al. | |
| 7,028,575 B2 | 4/2006 | Ehrmaier et al. | |
| 7,296,490 B2 | 11/2007 | Mashkevich et al. | |
| 7,393,304 B2 | 7/2008 | Wilde et al. | |
| 7,540,210 B2 | 6/2009 | Mashkevich et al. | |
| 7,541,553 B2 | 6/2009 | Meyer et al. | |
| 8,386,141 B2 | 2/2013 | Tanaka et al. | |
| 8,392,078 B2 | 3/2013 | Eriksson et al. | |
| 2001/0014845 A1 * | 8/2001 | Minowa et al. | 701/84 |
| 2007/0204710 A1 * | 9/2007 | Mandou et al. | 74/335 |
| 2007/0234843 A1 | 10/2007 | Knabe | |
| 2012/0078478 A1 | 3/2012 | Spaulding et al. | |
| 2013/0297159 A1 * | 11/2013 | Nishida et al. | 701/52 |

* cited by examiner

*Primary Examiner* — Edwin A Young
(74) *Attorney, Agent, or Firm* — Armstrong Teasdale LLP

(57) ABSTRACT

A vehicle includes a transmission including a plurality of operating modes, a shift selector including a switch mechanism associated with at least two operating modes of the plurality of operating modes, and a controller operably coupled to the transmission and to the shift selector. The controller is configured to receive a signal associated with the switch mechanism, identify a current operating mode associated with the transmission, and selectively shift the transmission from the current operating mode to one operating mode of the at least two operating modes. The one operating mode is determined based at least in part on the current operating mode.

20 Claims, 3 Drawing Sheets

METHODS AND SYSTEMS FOR SHIFTING A TRANSMISSION GEAR

BACKGROUND

The present disclosure relates to vehicles and, more particularly, to methods and systems for shifting a transmission gear in a vehicle.

At least some vehicles include a gear shift selector. For example, at least some vehicles include a lever movable along a first axis to enable a user to shift transmission gears. At least one known lever is positionable along the first axis in a plurality of positions that are each associated with a respective operating mode, such as park (P), reverse (R), neutral (N), and drive (D).

At least some vehicles include a fifth operating mode: sport (S). To accommodate the fifth operating mode, at least some known levers are moveable along a second axis that is generally perpendicular to the first axis when the lever is in the D position, such that the vehicle is shiftable between the D mode and the S mode.

BRIEF SUMMARY

In one aspect, a method is provided for shifting a transmission of a vehicle. The method includes receiving a signal associated with a switch mechanism that is associated with at least two operating modes, identifying a current operating mode associated with the transmission, and selectively shifting the transmission from the current operating mode to one operating mode of the at least two operating modes. The one operating mode is determined based at least in part on the current operating mode.

In one aspect, a method is provided for shifting a transmission of a vehicle. The method includes receiving a signal associated with a switch mechanism, determining a quantity of operating modes associated with the switch mechanism, selectively shifting the transmission from a current operating mode to a current operating mode based at least in part on the signal and the quantity of operating modes.

In yet another aspect, a vehicle is provided. The vehicle includes a transmission including a plurality of operating modes, a shift selector including a switch mechanism associated with at least two operating modes of the plurality of operating modes, and a controller operably coupled to the transmission and to the shift selector. The controller is configured to receive a signal associated with the switch mechanism, identify a current operating mode associated with the transmission, and selectively shift the transmission from the current operating mode to one operating mode of the at least two operating modes. The one operating mode is determined based at least in part on the current operating mode.

In yet another aspect, a vehicle is provided. The vehicle includes a transmission including a plurality of operating modes, a shift selector including a plurality of switch mechanisms, and a controller operably coupled to the transmission and to the shift selector. The controller is configured to receive a signal associated with one switch mechanism of the plurality of switch mechanisms, determine a quantity of operating modes associated with the one switch mechanism, and selectively shift the transmission from a current operating mode to a current operating mode based at least in part on the signal and the quantity of operating modes.

The features, functions, and advantages described herein may be achieved independently in various embodiments of the present disclosure or may be combined in yet other embodiments, further details of which may be seen with reference to the following description and drawings.

Although specific features of various implementations may be shown in some drawings and not in others, this is for convenience only. Any feature of any drawing may be referenced and/or claimed in combination with any feature of any other drawing.

DETAILED DESCRIPTION

The present disclosure relates to methods and systems for shifting a transmission gear of a vehicle. In one embodiment, the vehicle includes a transmission including a plurality of operating modes, and a shift selector including a switch mechanism associated with selecting at least two of the operating modes. The transmission is selectively shifted to one operating mode of the at least two operating modes associated with the switch mechanism based at least in part on a current operating mode of the transmission. Accordingly, the vehicle is able to accommodate an additional operating mode in a user-friendly manner that enables the user to quickly and confidently switch between the drive mode and the sport mode, for example.

As used herein, an element or step recited in the singular and preceded with the word "a" or "an" should be understood as not excluding plural elements or steps, unless such exclusion is explicitly recited. Furthermore, references to an "implementation" or an "embodiment" of the subject matter described herein are not intended to be interpreted as excluding the existence of additional implementations that also incorporate the recited features. The following detailed description of implementations consistent with the principles of the disclosure refers to the accompanying drawings. In the absence of a contrary representation, the same reference numbers in different drawings may identify the same or similar elements.

Figure 1:
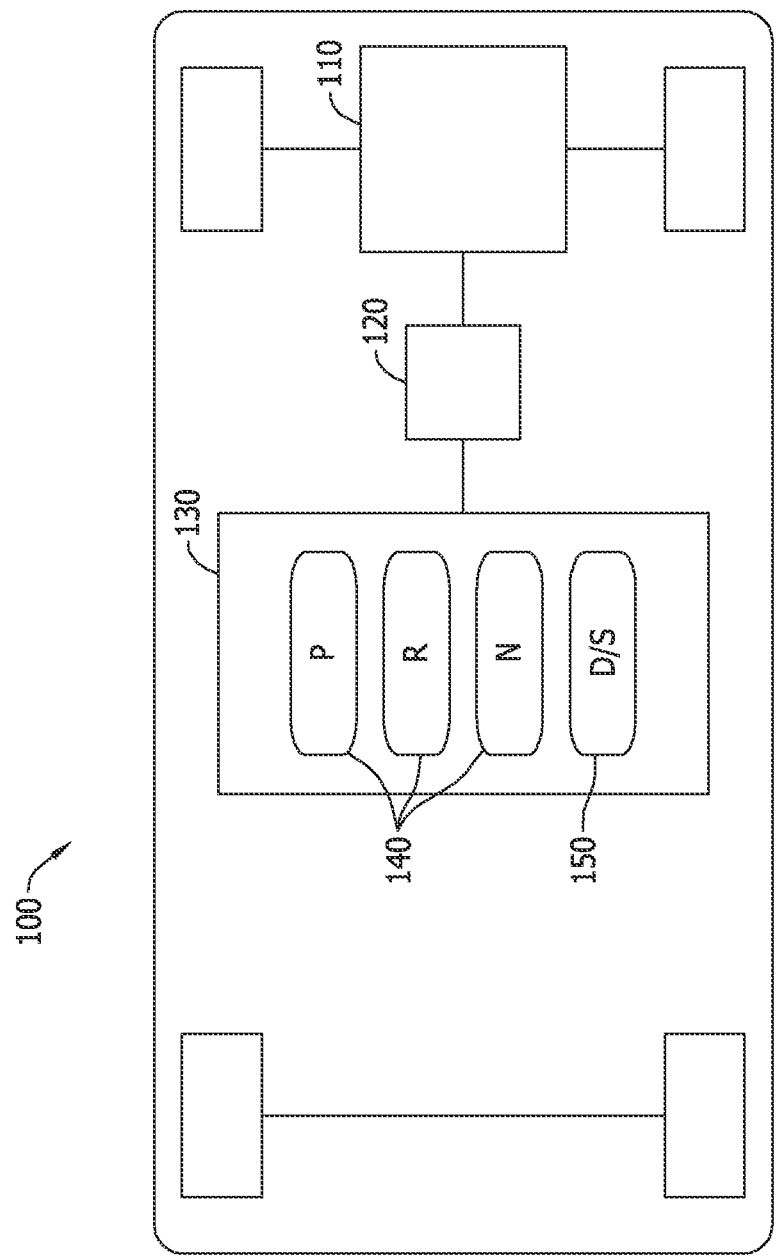
FIG. 1 is a schematic illustration of an exemplary vehicle including a transmission and a shift selector.

FIG. 1 is a schematic illustration of an exemplary vehicle 100. Vehicle 100 may be any vessel, aircraft, and/or vehicle including, without limitation, an automobile, a truck, a boat, a helicopter, and/or an airplane. In the exemplary embodiment, vehicle 100 includes an automatic, shift-by-wire transmission 110. Alternatively, vehicle 100 may include any type of transmission 110 that enables vehicle 100 to function as described herein.

In the exemplary embodiment, transmission 110 includes a plurality of gears or operating modes. For example, in at least some implementations, the operating modes include a park (P) mode, a reverse (R) mode, a neutral (N) mode, a drive (D) mode, and/or a sport (S) mode. Generally, the S mode provides a performance-oriented driving mode that is associated with higher engine revolutions per minute (RPM) than an RPM associated with the D mode. Other operating modes include, for example, a low gear (L) mode that provides a more robust engine braking when compared to the D mode, and an engine braking (B) mode that provides a more robust use of re-generative braking when compared to the D mode. The L mode may be used, for example, in a towing application, and the B mode may be used, for example, in a hybrid vehicle application. Alternatively, transmission 110 may include any combination of operating modes that enables transmission 110 to function as described herein.

In the exemplary embodiment, vehicle 100 includes a controller 120 and a gear shift selector, e.g., a shift selector 130, that are coupled to transmission 110 to enable a user to selectively control the operating mode associated with transmission 110. In the exemplary embodiment, shift selector 130 includes a plurality of switch mechanisms 140, 150, e.g., push-buttons, that are each associated with at least one operating mode. Switch mechanisms 140, 150 are referred to herein as buttons, however, shift selector 130 may include any switching device and/or mechanism that enables shift selector 130 to function as described herein.

In the exemplary embodiment, shift selector 130 includes at least one first switch mechanism 140, e.g., a "P" button, that is associated with a first operating mode, e.g., the P mode. In the exemplary embodiment, controller 120 is configured to selectively shift transmission 110 to the first operating mode when a received signal is associated with first switch mechanism 140.

Moreover, in the exemplary embodiment, shift selector 130 includes at least one second switch mechanism 150, e.g., a "D/S" button, that is associated with at least two operating modes, e.g., the D mode and the S mode. In the exemplary embodiment, controller 120 is configured to selectively shift transmission 110 to a second operating mode, e.g., the D mode, and/or a third operating mode, e.g., the S mode, when a received signal is associated with second switch mechanism 150. More specifically, in the exemplary embodiment, controller 120 selectively shifts transmission 110 to the second operating mode when the received signal is associated with second switch mechanism 150 and any operating mode other than the second operating mode is the current operating mode, i.e., the operating mode associated with transmission 110 immediately before and/or when a signal is received. Furthermore, in the exemplary embodiment, controller 120 selectively shifts transmission 110 to the third operating mode when the received signal is associated with second switch mechanism 150 and the second operating mode is the current operating mode. Alternatively, controller 120 may be configured to selectively shift transmission 110 based on any algorithm and/or system that enables vehicle 100 to function as described herein.

In some implementations, shift selector 130 includes a shift member (not shown) that is positionable in and/or that is moveable towards a plurality of positions. Each of the plurality of positions is associated with at least one operating mode. For example, in one implementation, a first position is associated with the D mode and the S mode, and a second position is associated with the R mode. When the shift member is positioned in and/or moved towards the first position, controller 120 selectively shifts transmission 110 to the D mode or the S mode when a received signal is associated with the first position. In one implementation, the shift member includes a button that is configured to selectively toggle between the D mode and the S mode when the shift member is positioned in and/or is moved towards the first position. Furthermore, when the shift member is positioned in and/or is moved towards the second position, controller 120 selectively shifts transmission 110 to the R mode when a received signal is associated with the second position.

Figure 2:
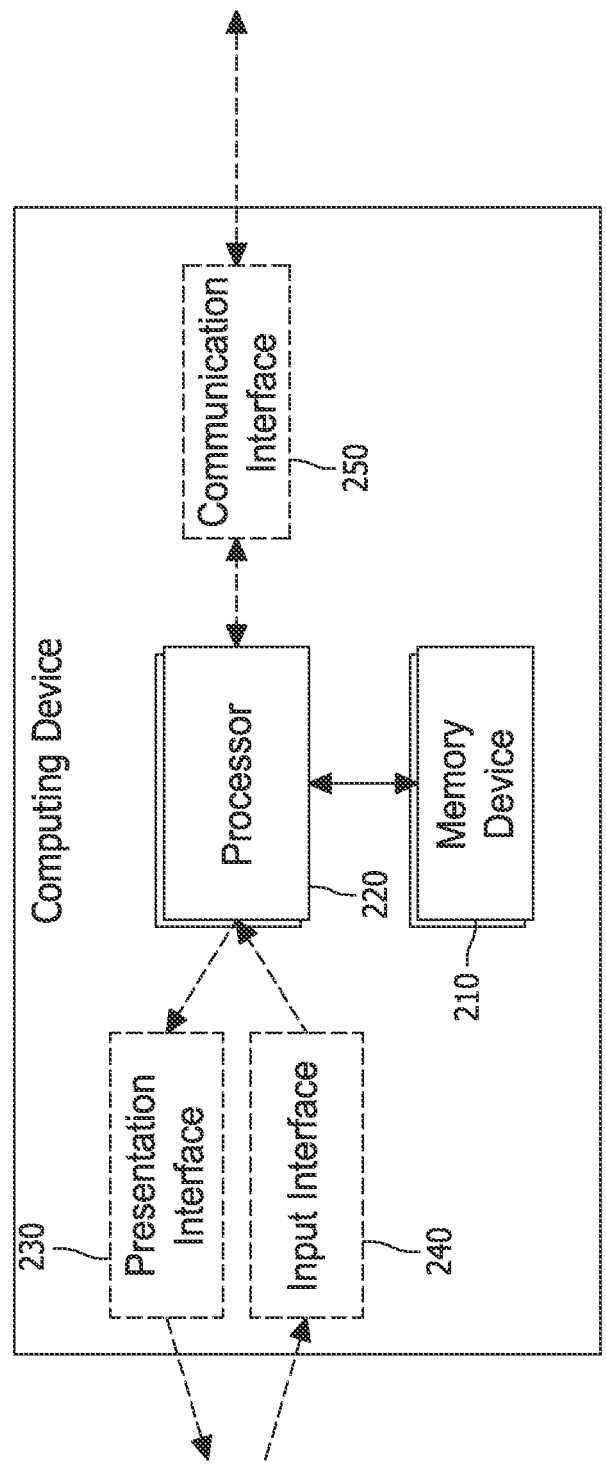
FIG. 2 is a schematic illustration of an exemplary controller that may be used with the vehicle shown in FIG. 1.

FIG. 2 is a schematic illustration of controller 120. In the exemplary embodiment, controller 120 includes at least one memory device 210 and a processor 220 that is coupled to memory device 210 for executing instructions. In some implementations, executable instructions are stored in memory device 210, and controller 120 performs one or more operations described herein by using processor 220 to execute the instructions stored in memory device 210.

Processor 220 may include one or more processing units (e.g., in a multi-core configuration). Further, processor 220 may be implemented using one or more heterogeneous processor systems in which a main processor is present with secondary processors on a single chip. In another illustrative example, processor 220 may be a symmetric multi-processor system containing multiple processors of the same type. Further, processor 220 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data.

In the exemplary embodiment, controller 120 includes a presentation interface 230 that is coupled to processor 220. Presentation interface 230 is configured to present information to a user (e.g., a current operating mode of transmission 110, shown in FIG. 1). In one implementation, presentation interface 230 presents a character and/or a light that indicates a current operating mode of transmission 110. For example, presentation interface 230 may include a display adapter (not shown) that may be coupled to a display device, such as a cathode ray tube (CRT), a liquid crystal display (LCD), an organic LED (OLED) display, and/or an "electronic ink" display. In some implementations, presentation interface 230 includes one or more display devices.

In the exemplary embodiment, controller 120 includes an input interface 240 (e.g., shift selector 130, shown in FIG. 1) that is coupled to processor 220. Input interface 240 is configured to receive input from a user. In addition to, or as an alternative to switch mechanisms 140, 150, input interface 240 may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 230 and input interface 240.

Controller 120, in the exemplary embodiment, includes a communication interface 250 coupled to processor 220. Communication interface 250 communicates with one or more remote devices. In the exemplary embodiment, communication interface 250 facilitates communication with transmission 110 (shown in FIG. 1) To communicate with remote devices, communication interface 250 may include, for example, a wired network adapter, a wireless network adapter, and/or a mobile telecommunications adapter.

Figure 3:
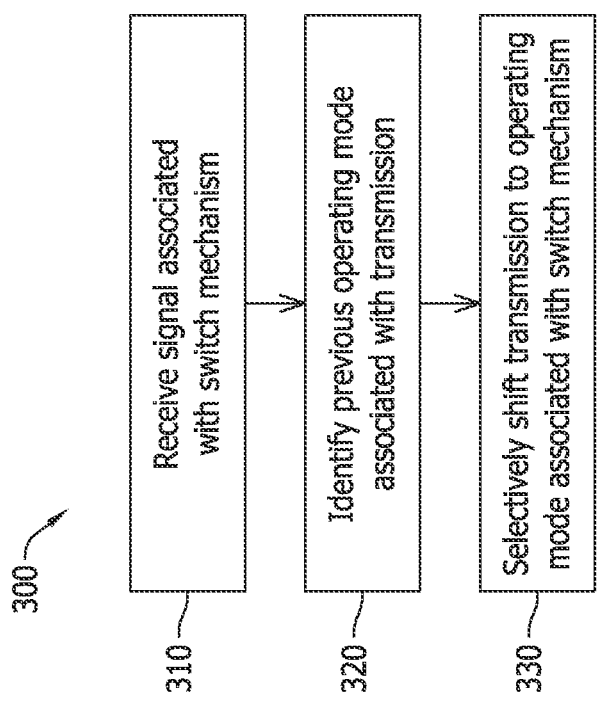
FIG. 3 is a flowchart of an exemplary method of shifting a transmission of a vehicle that may be implemented using the controller shown in FIG. 2.

FIG. 3 is a flowchart of an exemplary method 300 that may be implemented by controller 120 (shown in FIGS. 1 and 2) to selectively shift a transmission of a vehicle. In the exemplary embodiment, a signal is received 310 from second switch mechanism 150 (e.g., a "D/S" button), and a current operating mode (i.e., the operating mode associated with transmission 110 immediately before and/or when the signal is received 310) is identified 320. For example, controller 120 may receive 310 a signal from second switch mechanism 150 and identify 320 the current operating mode associated with transmission 110. Controller 120 may identify 320 by, for example, accessing stored information and/or by communicating with transmission 110. In the exemplary embodiment, transmission 110 is selectively shifted 330 from the current operating mode to one of the at least two operating modes associated with second switch mechanism 150 (e.g., either the D mode or the S mode).

In at least some implementations, a signal is received 310 from a switch mechanism, e.g., second switch mechanism 150, and a quantity of operating modes associated with the switch mechanism is determined. In such implementations, if the quantity of operating modes associated with the switch mechanism is identified as being one, then transmission 110 is selectively shifted to the one operating mode associated with the switch mechanism. If the quantity of operating modes associated with the switch mechanism is identified as being at least two, then transmission 110 is selectively shifted to one of the at least two operating modes associated with the switch mechanism.

In the exemplary embodiment, the determination of which of the at least two operating modes is based at least in part on the current operating mode. For example, in the exemplary embodiment, when the current operating mode is any operating mode other than the D mode, transmission 110 is selectively shifted to the D mode and, when the current operating mode is the D mode, transmission 110 is selectively shifted to the S mode.

The methods and systems described herein may be implemented using computer programming or engineering techniques including computer software, firmware, hardware or any combination or subset thereof, wherein the technical effects may be achieved by performing at least one of the following steps: a) receiving a signal associated with a switch mechanism; b) determining a quantity of operating modes associated with the switch mechanism; c) identifying a position associated with a shift member; d) identifying a current operating mode associated with the transmission; and e) selectively shifting the transmission from the current operating mode to an operating mode associated with the switch mechanism and/or the position.

The present disclosure relates to vehicles and, more particularly, to methods and systems for shifting a transmission gear in a vehicle. The methods and systems described herein enable a user to quickly and confidently switch between the drive mode and the sport mode. For example, the user may select a button to toggle between the drive mode and the sport mode. The methods and systems described herein provide a user-friendly interface that facilitates decreasing a time and/or increasing a user confidence associated with shifting gears.

Exemplary embodiments of shifting assemblies are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of shifting a transmission of a vehicle, the method comprising:
    receiving a signal associated with a first switch mechanism of a shift selector, the first switch mechanism associated with at least two operating modes and the shift selector including at least the first switch mechanism and a second switch mechanism;
    identifying a first, current operating mode associated with the transmission; and
    selectively shifting the transmission from the first, current operating mode to one operating mode of the at least two operating modes, wherein the one operating mode is determined based at least in part on the first, current operating mode.

2. A method in accordance with claim 1, wherein the at least two operating modes includes a drive operating mode, and wherein selectively shifting the transmission further comprises selectively shifting the transmission to the drive operating mode when the first, current operating mode is not the drive operating mode.

3. A method in accordance with claim 1, wherein the at least two operating modes include a drive operating mode and a sport operating mode.

4. A method in accordance with claim 3, wherein selectively shifting the transmission further comprises selectively shifting the transmission to the sport operating mode when the first, current operating mode is the drive operating mode.

5. A method in accordance with claim 1 further comprising identifying a first position of at least two positions associated with a shift member, wherein the first position is associated with the at least two operating modes.

6. A method of shifting a transmission of a vehicle, the transmission comprising a plurality of operating modes, the method comprising:
    receiving a signal associated with a switch mechanism;
    determining a quantity of operating modes associated with the switch mechanism from the plurality of operating modes; and
    selectively shifting the transmission from a first, current operating mode of the plurality of operating modes to a second operating mode of the determined quantity of operating modes based at least in part on the signal and the determined quantity of operating modes.

7. A method in accordance with claim 6, wherein selectively shifting the transmission further comprises selectively shifting the transmission from the first, current operating mode to a single operating mode associated with the switch mechanism when the determined quantity of operating modes includes only the single operating mode.

8. A method in accordance with claim 6, wherein selectively shifting the transmission further comprises selectively shifting the transmission from the first, current operating mode to one of at least two operating modes associated with the switch mechanism when the determined quantity of operating modes includes the at least two operating modes.

9. A method in accordance with claim 6, wherein selectively shifting the transmission further comprises selectively shifting the transmission to a drive operating mode, wherein the first, current operating mode is not the drive operating mode and the at least two operating modes comprise the drive operating mode.

10. A method in accordance with claim 6, wherein selectively shifting the transmission further comprises selectively shifting the transmission to a sport operating mode, wherein the first, current operating mode is a drive operating mode and the at least two operating modes comprise the drive operating mode and the sport operating mode.

11. A vehicle comprising:
a transmission comprising a plurality of operating modes;
a shift selector comprising at least one first switch mechanism and a second switch mechanism associated with at least two operating modes of the plurality of operating modes, wherein the second switch mechanism is configured to produce a signal; and
a controller operably coupled to the transmission and to the shift selector, wherein the controller is configured to receive the signal, identify a first, current operating mode of the plurality of operating modes, and selectively shift the transmission from the first, current operating mode to a second operating mode of the at least two operating modes, wherein the second operating mode is determined based at least in part on the first, current operating mode.

12. A vehicle in accordance with claim 11, wherein the second operating mode is a drive operating mode, and the first, current operating mode is not the drive operating mode.

13. A vehicle in accordance with claim 11, wherein the second operating mode is a sport operating mode, and the first, current operating mode is a drive operating mode.

14. A vehicle in accordance with claim 11, wherein the at least two operating modes comprises at least a drive mode and a sport mode.

15. A vehicle in accordance with claim 11 further comprising a shift member that is operably coupled to the controller, wherein the controller is further configured to identify a position associated with the shift member, the position associated with the at least two operating modes.

16. A vehicle comprising:
a transmission comprising a plurality of operating modes;
a shift selector comprising a plurality of switch mechanisms comprising a first switch mechanism; and
a controller operably coupled to the transmission and to the shift selector, wherein the controller is configured to receive a signal associated with the first switch mechanism, determine a quantity of operating modes associated with the first switch mechanism from the plurality of operating modes, and selectively shift the transmission from a first, current operating mode of the plurality of operating modes to a second operating mode of the determined quantity of operating modes based at least in part on the signal and the determined quantity of operating modes.

17. A vehicle in accordance with claim 16, wherein the controller is further configured to selectively shift the transmission from the first, current operating mode to a single operating mode when the controller determines the quantity of operating modes includes only the single operating mode.

18. A vehicle in accordance with claim 16, wherein the controller is further configured to selectively shift the transmission from the first, current operating mode to one of two operating modes associated with the one switch mechanism when the controller determines the quantity of operating modes includes the two operating modes.

19. A vehicle in accordance with claim 16, wherein the controller is further configured to selectively shift the transmission to a drive operating mode, wherein the first, current operating mode is not the drive operating mode and the determined quantity of operating modes comprises the drive operating mode.

20. A vehicle in accordance with claim 16, wherein the controller is further configured to selectively shift the transmission to a sport operating mode, wherein the first, current operating mode is a drive operating mode and the determined quantity of operating modes comprises the drive operating mode and the sport operating mode.

* * * * *